United States Patent
Wang

(10) Patent No.: US 10,945,484 B1
(45) Date of Patent: Mar. 16, 2021

(54) HAPTIC OUTPUT DEVICES

(71) Applicant: Apple Inc., Cupertino, CA (US)

(72) Inventor: Paul X. Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 132 days.

(21) Appl. No.: 15/962,928

(22) Filed: Apr. 25, 2018

Related U.S. Application Data

(60) Provisional application No. 62/526,152, filed on Jun. 28, 2017.

(51) Int. Cl.
| | |
|---|---|
| A43B 3/00 | (2006.01) |
| A43B 7/14 | (2006.01) |
| G06F 3/045 | (2006.01) |
| G06F 3/01 | (2006.01) |
| A43B 13/18 | (2006.01) |

(52) U.S. Cl.
CPC ............ *A43B 3/0005* (2013.01); *A43B 7/142* (2013.01); *G06F 3/011* (2013.01); *G06F 3/045* (2013.01); *A43B 13/182* (2013.01); *G06F 3/016* (2013.01)

(58) Field of Classification Search
CPC ............................... G06F 3/011; G06F 3/0334
See application file for complete search history.

(56) References Cited

U.S. PATENT DOCUMENTS

| | | | | |
|---|---|---|---|---|
| 5,872,438 A | * | 2/1999 | Roston .................. | B25J 9/1689 318/568.1 |
| 5,913,727 A | * | 6/1999 | Ahdoot .................. | A63F 13/06 463/39 |
| 6,102,832 A | * | 8/2000 | Tani ........................ | G06F 3/011 482/4 |
| 6,769,313 B2 | * | 8/2004 | Weiss ..................... | G01L 1/205 73/862.046 |
| 6,916,273 B2 | * | 7/2005 | Couvillion, Jr. ...... | A63B 22/025 482/8 |
| 7,219,449 B1 | | 5/2007 | Hoffberg et al. | |
| 7,381,152 B2 | * | 6/2008 | Couvillion, Jr. ... | A61M 16/0429 482/8 |

(Continued)

FOREIGN PATENT DOCUMENTS

WO   WO-2015047364 A1 *   4/2015

*Primary Examiner* — Patrick F Marinelli
(74) *Attorney, Agent, or Firm* — Treyz Law Group, P.C.; G. Victor Treyz; David K. Cole

(57) ABSTRACT

Haptic output devices may provide haptic output to a user. The haptic output devices may include foot-shaped structures with cavities configured to receive the feet of users. The haptic output devices may also include foot platforms with planar exterior surfaces on which a user may stand. In hybrid arrangements, haptic output devices include foot-shaped support structures with components such as magnets and a foot platform components with corresponding electromagnets. Haptic output components such as piezoelectric components, electroactive polymer components, electromagnetic actuators, and other haptic output components may be mounted to haptic output device support structures in arrays. Shear forces and forces normal to the inner surfaces of a foot-shaped support surface and/or the exterior surface of a foot platform may be generated. Haptic output may be generated based on sensor signals such as sensor signals associated with foot movement.

13 Claims, 7 Drawing Sheets

(56) References Cited

U.S. PATENT DOCUMENTS

| | | | |
|---|---|---|---|
| 7,381,153 B2* | 6/2008 | Couvillion, Jr. | G09B 9/00 482/8 |
| 7,387,592 B2* | 6/2008 | Couvillion, Jr. | A61M 16/0429 482/8 |
| 7,520,836 B2* | 4/2009 | Couvillion, Jr. | G09B 19/00 482/8 |
| 7,588,516 B2* | 9/2009 | Couvillion, Jr. | G09B 19/00 482/8 |
| 7,816,632 B2* | 10/2010 | Bourke, III | A43B 7/025 219/635 |
| 8,123,660 B2* | 2/2012 | Kruse | A63B 24/0062 482/3 |
| 8,368,641 B2 | 2/2013 | Tremblay et al. | |
| 8,474,156 B2* | 7/2013 | Kim | A43B 1/0054 335/207 |
| 8,523,740 B2* | 9/2013 | Kruse | A63B 24/0062 482/3 |
| 8,676,541 B2* | 3/2014 | Schrock | A43B 3/00 702/188 |
| 8,981,682 B2 | 3/2015 | Delson et al. | |
| 9,041,521 B2* | 5/2015 | Cooperstock | G06F 3/011 318/568.16 |
| 9,089,182 B2* | 7/2015 | Schrock | A43B 3/00 |
| 9,462,844 B2* | 10/2016 | Schrock | A43B 3/00 |
| 9,549,585 B2* | 1/2017 | Amos | G01L 1/22 |
| 9,622,537 B2* | 4/2017 | Amos | A43B 3/00 |
| 9,763,489 B2* | 9/2017 | Amos | A43B 3/0005 |
| 9,955,904 B2* | 5/2018 | Oddsson | A61B 5/1116 |
| 9,971,410 B2* | 5/2018 | Keller | G06F 3/016 |
| 10,024,660 B2* | 7/2018 | Otis | G01B 21/30 |
| 10,070,680 B2* | 9/2018 | Molyneux | A63B 60/46 |
| 10,136,842 B2* | 11/2018 | Ashby | A61B 5/1038 |
| 10,172,409 B1* | 1/2019 | Andon | A43B 3/001 |
| 10,178,890 B1* | 1/2019 | Andon | G08G 1/005 |
| 10,188,170 B2* | 1/2019 | Bramani | A43B 3/0005 |
| 10,228,758 B2* | 3/2019 | Smoot | G06F 3/011 |
| 10,335,341 B2* | 7/2019 | Shim | A61B 5/1038 |
| 10,362,830 B2* | 7/2019 | Campbell | A61H 23/0263 |
| 2003/0051561 A1* | 3/2003 | Weiss | G01L 1/205 73/862.046 |
| 2007/0097073 A1* | 5/2007 | Takashima | G06F 3/016 345/156 |
| 2007/0236450 A1* | 10/2007 | Colgate | G06F 3/016 345/156 |
| 2008/0197126 A1* | 8/2008 | Bourke | A43B 7/025 219/634 |
| 2009/0167677 A1* | 7/2009 | Kruse | A63B 24/0062 345/156 |
| 2010/0063778 A1* | 3/2010 | Schrock | A43B 3/00 702/188 |
| 2010/0063779 A1* | 3/2010 | Schrock | A43B 3/00 702/188 |
| 2010/0152619 A1 | 6/2010 | Kalpaxis et al. | |
| 2010/0256537 A1 | 10/2010 | Menga | |
| 2010/0308982 A1* | 12/2010 | Cooperstock | G06F 3/011 340/407.1 |
| 2011/0047828 A1* | 3/2011 | Shuster | A43B 13/141 36/112 |
| 2011/0193323 A1* | 8/2011 | Rivard | A63C 10/285 280/613 |
| 2011/0242316 A1* | 10/2011 | Guerrero | G06F 3/011 348/143 |
| 2012/0068957 A1* | 3/2012 | Puskarich | G06F 3/016 345/174 |
| 2012/0169442 A1* | 7/2012 | Kim | A43B 1/0054 335/306 |
| 2012/0212340 A1* | 8/2012 | Kruse | A63B 24/0062 340/539.12 |
| 2012/0234111 A1* | 9/2012 | Molyneux | A43B 3/00 73/862.541 |
| 2012/0286847 A1 | 11/2012 | Peshkin et al. | |
| 2012/0291563 A1* | 11/2012 | Schrock | A43B 3/00 73/862.041 |
| 2012/0291564 A1* | 11/2012 | Amos | A61B 5/6807 73/862.045 |
| 2013/0213146 A1* | 8/2013 | Amos | A43B 3/0005 73/862.046 |
| 2013/0312288 A1* | 11/2013 | Colthurst | A43B 3/0042 36/103 |
| 2014/0266570 A1* | 9/2014 | Sharma | A43B 3/0005 340/4.12 |
| 2016/0081418 A1* | 3/2016 | Amos | A43B 3/00 36/132 |
| 2016/0143562 A1* | 5/2016 | Ashby | A61B 5/1038 600/595 |
| 2016/0206499 A1* | 7/2016 | Shim | A61B 5/1038 |
| 2016/0216764 A1* | 7/2016 | Morrell | G08B 6/00 |
| 2016/0302509 A1* | 10/2016 | Amos | A43B 3/0005 |
| 2016/0320802 A1* | 11/2016 | McClure | G06F 1/1613 |
| 2017/0020224 A1* | 1/2017 | Amos | A43B 3/00 |
| 2017/0071283 A1* | 3/2017 | James | A43B 3/00 |
| 2017/0079368 A1* | 3/2017 | Amos | G06F 3/0334 |
| 2017/0186300 A1* | 6/2017 | Wang | A43B 3/0005 |
| 2017/0290390 A1* | 10/2017 | Bramani | A43B 3/0005 |
| 2017/0351333 A1* | 12/2017 | Keller | G06F 3/016 |
| 2018/0132560 A1* | 5/2018 | Kim | A43B 3/0005 |
| 2018/0160766 A1* | 6/2018 | Zahrieh | A43B 7/02 |
| 2018/0199656 A1* | 7/2018 | Doll | A43B 3/0005 |
| 2018/0213879 A1* | 8/2018 | Campbell | A61H 23/02 |
| 2018/0338560 A1* | 11/2018 | Molyneux | A43B 3/00 |
| 2018/0365941 A1* | 12/2018 | Levesque | A43B 11/00 |
| 2019/0056837 A1* | 2/2019 | Datta | G06F 3/0414 |
| 2019/0174862 A1* | 6/2019 | Rakshit | G06F 3/016 |
| 2019/0210065 A1* | 7/2019 | Rinner | B06B 1/0603 |
| 2019/0269352 A1* | 9/2019 | Brown | A61B 5/1038 |
| 2019/0291002 A1* | 9/2019 | Yokoyama | A63F 13/285 |
| 2020/0113271 A1* | 4/2020 | Kramer | H04B 1/385 |

* cited by examiner

HAPTIC OUTPUT DEVICES

This application claims the benefit of provisional patent application No. 62/526,152, filed Jun. 28, 2017, which is hereby incorporated by reference herein in its entirety.

FIELD

This relates generally to electronic equipment, and, more particularly, to electronic equipment that supplies haptic output.

BACKGROUND

Devices such as wearable devices sometimes incorporate haptic output components. Haptic output components may supply a user with haptic output while the user is interacting with software such as gaming software.

It can be challenging to design a haptic output device. If care is not taken, haptic output may too weak or may not provide a desired sensation for a user, haptic output may not be applied to an appropriate location on the body of a user, or a haptic output device may be overly bulky or difficult to use.

SUMMARY

Haptic output devices may provide haptic output to a user. The haptic output devices may include foot-shaped structures such as socks and shoes with cavities configured to receive the feet of users. The haptic output devices may also include foot platforms with planar exterior surfaces on which a user may stand. In hybrid arrangements, haptic output devices include foot-shaped support structures with components such as magnets and foot-platform components with corresponding electromagnets.

Haptic output components may be arranged in an array on a haptic output device. The haptic output components may include piezoelectric components, electroactive polymer components, electromagnetic actuators, and other haptic output components.

During operation, shear forces and forces normal to the inner surfaces of a foot-shaped support surface and/or the exterior surface of a foot platform may be generated. These forces may provide a user with a sensation of resting or sliding across a tiled surface or other surface with surface irregularities. Friction effects (e.g., resistance to lateral motion) and other effects may also be produced using the haptic output devices.

Control circuitry may supply control signals to haptic output components in a haptic output device to produce haptic output. The haptic output may be generated based on sensor signals such as sensor signals associated with foot movement and/or based on information received from an external electronic device.

DETAILED DESCRIPTION

Figure 1:
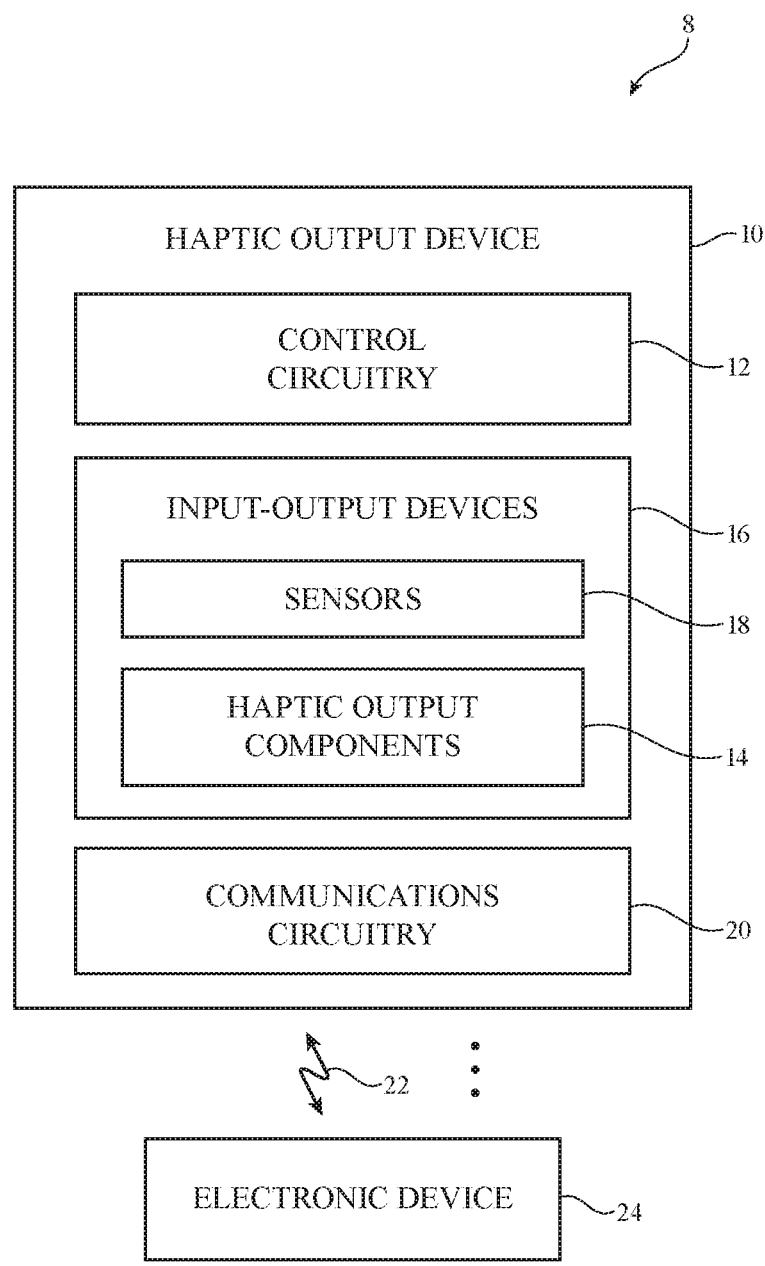
FIG. 1 is a schematic diagram of an illustrative system in accordance with an embodiment.

Electronic systems such as illustrative system 8 of FIG. 1 may include haptic output devices such as haptic output device 10. Haptic output device 10 may be a stand-alone device and/or may operate in conjunction with additional electronic devices such as electronic device 24. Device 10 may be used in supplying a user with haptic output and may, if desired, be a wearable haptic output device. In one illustrative configuration, which may sometimes be described herein as an example, haptic output device 10 may have the shape of a sock, shoe, or other device that is worn on the foot of a user.

As illustrated by communications link 22, haptic output device 10 may communicate with one or more additional haptic output devices 10 and/or electronic devices such as electronic device 24. Links such as link 22 in system 8 may be wired or wireless communication links. Each device in system 8 such as haptic output device 10 may include communications circuitry such as communications circuitry 20 of device 10 for supporting communications over links such as link 22.

Communications circuitry 20 may include wired and wireless communications circuitry. Communications circuitry 20 in one device may be used to support communications over one or more wired or wireless communications links (e.g., link 22) with one or more additional devices (e.g., a peer device, a host, an accessory, etc.). Wireless circuitry in communications circuitry 20 may include one or more antennas and one or more radio-frequency transceiver circuits. Wireless communications circuitry may be used to support wireless communications over cellular telephone bands, wireless local area network bands, near field communications bands, etc.

As shown in FIG. 1, electronic device 10 may have control circuitry 12. Control circuitry 12 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 16 may be used to allow data to be supplied to device 10 and to allow data to be provided from device 10 to external devices. Input-output devices 16 may include buttons, joysticks, scrolling wheels, touch pads, key pads, keyboards, microphones, speakers, tone generators, vibrators, cameras (e.g., cameras configured to visually monitor foot movements, etc.), displays and/or other light-emitting components, light-emitting diodes and other status indicators, data ports, components for generating heat and/or cooling such as Peltier effect devices, resistive coils for Ohmic heating, and/or other components that can generate heat in response to control signals from control circuitry 12, cooling fans, heaters that provide heated air (e.g., resistive coils and associated fans), systems that circulate heated and/or cooled liquids, components for adjusting moisture (e.g., components such as water reservoirs and pumps for dispensing water or other liquids through openings and thereby adjusting the humidity of the environment surrounding a user's foot), etc. If desired, input-output devices 16 may include electrically adjustable actuators such as pneumatic actuators, electromagnetic actuators (motors, linear actuators, etc.), and/or other positioning devices that can locally and/or globally adjust the height and/or orientation of one or more portions of some or all of device 10 (e.g., an actuator to selectively tilt a platform, etc.).

Input-output devices 16 may include sensors such as sensors 18. Sensors 18 may include force sensors, touch sensors, temperature sensors, air pressure sensors, moisture sensors, ambient light sensors and other light-based sensors, magnetic sensors, and/or other sensors. If desired, sensors 18 may include position and motion sensors such as inertial measurement units that include accelerometers, compasses, and/or gyroscopes. Control circuitry 12 may use sensors 18 to gather information such as information on movement of device 10. Haptic output components 14 in input-output devices 16 may be used to provide haptic output to a user (e.g., based on sensed movement, wirelessly received information, etc.). In some configurations (e.g., when a haptic output component 14 has a piezoelectric material), components can serve both as haptic output components 14 and as sensors 18. For example, a piezoelectric material may be driven with a signal to supply haptic output and, when not driven, may produce an output signal indicative of applied force.

In some configurations, device 10 may serve as a stand-alone device. A stand-alone haptic output device may be used independently and need not be used with external equipment. Battery power and/or power received wirelessly, via wired connection, or via an energy harvesting device in device 10 may be used in powering device 10. In some stand-alone arrangements, stand-alone devices may occasionally gather information from external equipment (e.g., settings, etc.) and/or may supply output to external equipment (e.g., usage history information, etc.). In other stand-alone arrangements, stand-alone devices are never coupled to external equipment.

In other configurations, device 10 serves as an accessory and is used exclusively or at least frequently in conjunction with another electronic device such as device 24. In this type of operating environment, device 24 may, as an example, be a computer or other device running a computer game or other software for a user and haptic output device 10 may communicate with the computer via a wired or wireless connection so that device 10 can provide a user with haptic output during the computer game.

Device 24 of FIG. 1 may be a computing device such as a laptop computer, a computer monitor containing an embedded computer, a tablet computer, a cellular telephone, a media player, or other handheld or portable electronic device, a smaller device such as a wrist-watch device (e.g., a watch with a wrist strap), a pendant device, a headphone or earpiece device, a device embedded in eyeglasses or other head-mounted equipment worn on a user's head, or other wearable or miniature device, a computer display that does not contain an embedded computer, a gaming device, a navigation device, an embedded system such as a system in which electronic equipment with a display is mounted in a kiosk or automobile, a remote control, a voice-controlled Internet-connected speaker (e.g., an artificial intelligence assistance device, home assistant, etc.), a set-top box, equipment that implements the functionality of two or more of these devices, or other electronic equipment.

Device 10 may be a wearable device such as a sock or shoe or other device that is received on the foot of a user, may be a platform (pad) or other planar foot platform on which a user stands, and/or may be other equipment (e.g., a device such as device 24, etc.). In some configurations, the components of device 10 may be mounted in two or more mounting structures. For example, some of the components of device 10 may be enclosed in a structure that is worn on a user's foot and associated components may be mounted in a planar pad or other platform on which a user stands. System 8 may include a single haptic output device 10 (e.g., a device worn on a foot of a user) or may include multiple haptic output devices 10 (e.g., a first device to be worn on the left foot of a user and a second device to be worn on the right foot of a user). In a system with multiple haptic output devices, the haptic output devices may be operated in coordination with each other. For example, a computer game may direct devices worn on the left and right feet of a user to alternately supply a haptic output pulse, thereby creating a sensation in movement across the surfaces of the user's left and right feet. The operations associated with a single haptic output device 10 may sometimes be described herein as an example.

FIGS. 2, 3, 4, 5, 6, and 7 are diagrams of illustrative haptic output components.

Figure 2:
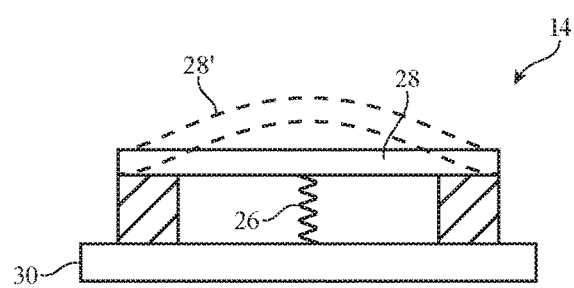
FIG. 2 is a cross-sectional side view of an illustrative haptic output component with a central deflecting portion in accordance with an embodiment.

Illustrative haptic output component 14 of FIG. 2 has a piezoelectric member such as member 28. A biasing structure such as spring 26 is interposed between support structure 30 and the lower surface of member 28 and configured to push upwards on member 28. During operation, control signals (e.g., control voltages) may be applied to member 28 using electrodes on the upper and lower surfaces of member 28. The control signals may be adjusted to adjust the tension of member 28. When member 28 is adjusted to exhibit a high tension, member 28 will compress spring 26 and will have a planar shape. When member 28 is adjusted to exhibit low tension, member 28 will relax and will be moved upwards to position 28' by spring 26.

Figure 3:
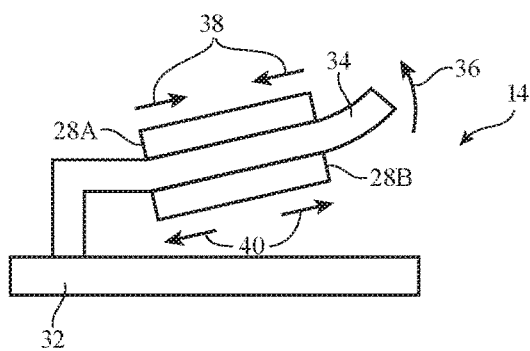
FIG. 3 is a cross-sectional side view of an illustrative deflecting beam haptic output component in accordance with an embodiment.

Illustrative haptic output component 14 may have a deflectable beam such as beam 34 of FIG. 3 that is attached to support structure 32. Piezoelectric members 28A and 28B may be coupled to the upper and lower surfaces of beam 34. Control signals may be supplied to electrodes in members 28A and 28B to cause these members to contract or expand. As shown in FIG. 3, for example, signals may be supplied to members 28A and 28B to cause member 28A to contract inwardly in directions 38 while causing member 28B to expand outwardly in directions 40. This causes beam 34 to deflect in direction 36.

Figure 4:
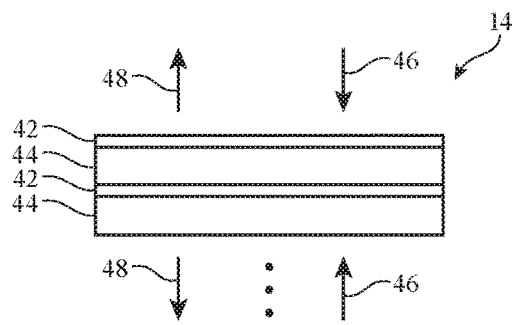
FIG. 4 is cross-sectional side view of an illustrative haptic output component based on a stack of haptic output structures in accordance with an embodiment.

Illustrative haptic output component 14 of FIG. 4 is formed from electrode layers 42 and adjustable material layers 44. During operation, control circuitry 12 may supply signals to electrode layers 42 that cause layers 44 to expand and contract. Multiple stacks of layers 42 and 44 may be included in component 14 to enhance the amount of displacement that is produced for a given applied signal. With one illustrative configuration, haptic output component 14 may be an electroactive polymer device (e.g., layers 44 may be formed from electroactive polymer). Arrangements of the type shown in FIG. 4 may also be used with piezoelectric ceramic layers, etc.

Figure 5:
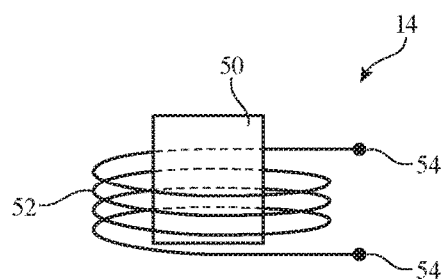
FIG. 5 is a side view of an illustrative voice coil haptic output component in accordance with an embodiment.

If desired, haptic output component 14 may be formed using electromagnetic structures. With one illustrative arrangement, which is shown in FIG. 5, haptic output component 14 is a voice coil actuator formed from a coil such as coil 52 and a corresponding magnet such as magnet 50. When current is supplied to terminals 54 of coil 52, a magnetic field is generated by coil 52. This magnetic field produces a force between magnet 50 and coil 52 and thereby causes magnet 50 and coil 52 to move relative to each other (e.g., vertically in the orientation of FIG. 5). Component 14 may use a moving coil design in which coil 52 is moved when current is applied to terminals 54 or a moving magnetic design in which magnet 50 is moved when current is applied to terminals 54. Haptic output components such as component 14 of FIG. 5 may sometimes be referred to as electromagnetic actuators. Any suitable geometry may be used for an electromagnetic actuator (rotary, linear, etc.). The configuration of FIG. 5 is merely illustrative.

Figure 6:
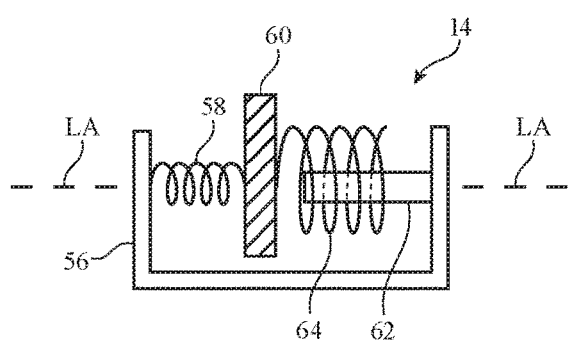
FIG. 6 is a cross-sectional side view of an illustrative linear resonance actuator haptic output component in accordance with an embodiment.

As shown in FIG. 6, haptic output component 14 may be a linear resonant actuator. Component 14 of FIG. 6 has a support structure such as support structure 56. Moving mass 60 is coupled to support structure 56 by spring 58. Coil 64 may receive a drive current and may interact electromagnetically with magnet 62. Coil 64 may be coupled to moving mass 60 and magnet 62 may be coupled to support structure 56 or vice versa, so that application of drive signals to coil 64 will cause moving magnet 60 to oscillate along axis LA.

Figure 7:
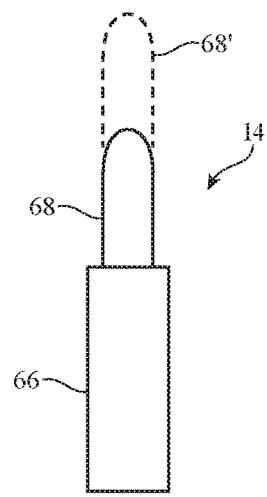
FIG. 7 is a side view of an illustrative haptic output component with a portion that extends when actuated in accordance with an embodiment.

As shown in FIG. 7, haptic output component 14 may have portion such as portion 68 that can be displaced (e.g., to a position such as displaced position 68' in the FIG. 7 example). Fluid such as pressurized air, rheological fluid that changes in viscosity under applied magnetic fields from an electromagnet in component 14, pressurized water, and/or other fluid may be introduced into a chamber in support structure 66 with controllable properties (pressure, viscosity, etc.), thereby adjusting the displacement of portion 68. Portion 68 may be an expandable diaphragm, may be a movable pin, or may be other suitable movable structure. If desired, an electromagnetic actuator (e.g., a servomotor or other motor, solenoid, etc.) can be used to adjust the displacement of portion 68.

Figure 8:
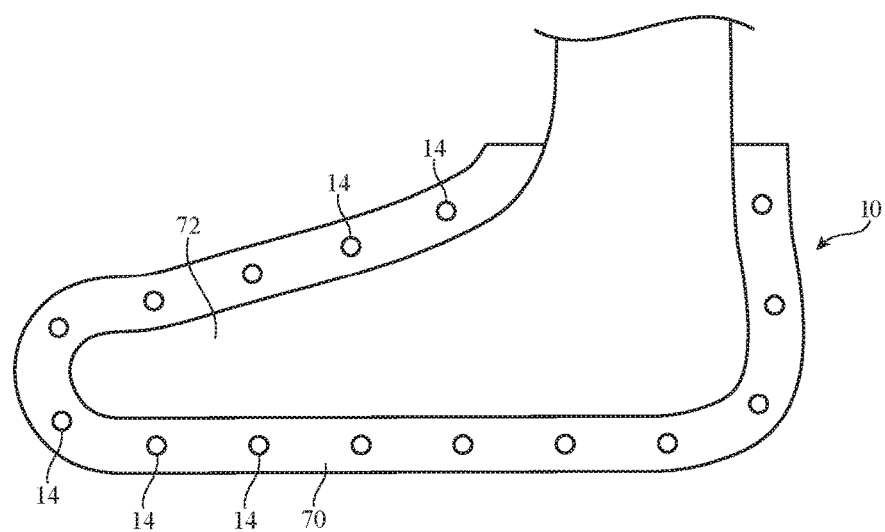
FIG. 8 is a cross-sectional side view of an illustrative haptic output device having the shape of a sock or shoe in accordance with an embodiment.
Figure 9:
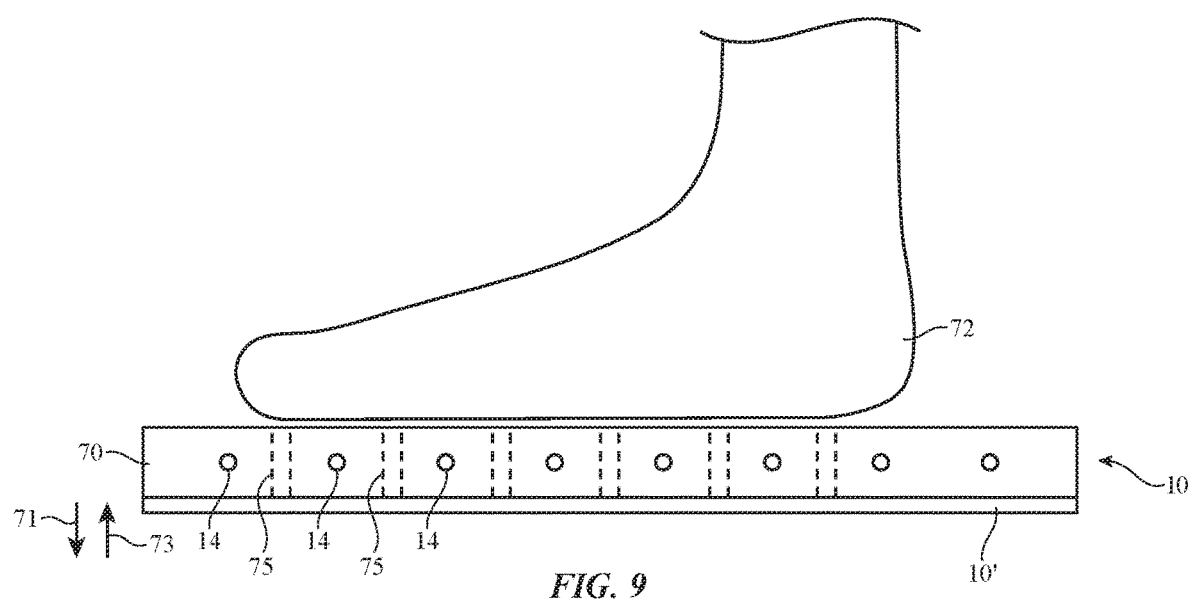
FIG. 9 is a cross-sectional side view of an illustrative haptic output device with a platform-shaped foot support structure in accordance with an embodiment.

FIGS. 8 and 9 are illustrative configurations for device 10 showing how device 10 may include support structure 70 and an array of haptic output components 14. Device 10 may also have one or more sensors 18 and other input-output devices 16 in locations such as locations adjacent to haptic output components 14. Sensors 18 may, for example, measure movement of device 10 by a user.

Support structure 70 may have housing walls (sometimes referred to as an enclosure or a body for device 10) and may have portions formed from metal, glass, ceramic, wood, polymer, or other materials. These structures may be breathable (e.g., to allow perspiration to evaporate), may be stretchable (e.g., to enhance fit and user comfort), and, if desired, may be lightweight (e.g., to reduce user fatigue). In some arrangements, fabric may be used in forming some or all of support structure 70. In the arrangement of FIG. 8, support structure 70 has a shape of a sock or shoe that forms a cavity that receives a user's foot such as foot 72 (e.g., device 10 is a sock, shoe, or other wearable item and support structure 70 forms a foot-shaped foot-wearable support structure with a foot-shaped interior cavity surface). In the arrangement of FIG. 9, support structure 70 forms a planar pad (sometimes referred to as a platform, standing platform, foot-supporting platform, planar foot platform, planar foot platform structure, etc.) having an exposed exterior surface on which a user may stand (e.g., so that foot 72 rests on the top of the foot platform).

The feet of a user of device 10 such as foot 72 may be bare or a user may wear a sock, shoe, or other item in addition to wearing device 10 of FIG. 8 or standing on device 10 of FIG. 9. In some configurations, portions of components 14 may be located in an item worn on foot 72 such as device 10 of FIG. 8 and other portions of components 14 may be located in an item such as the platform device 10 of FIG. 9.

If desired, device 10 (e.g., the platform of FIG. 9, etc.) may include heating and/or cooling elements, positioners, and/or other input-output devices 16. These temperature control components may, for example, be located in portion 10' of device 10, as shown in FIG. 9. Portion 10' may, for example, include one or more heating and/or cooling elements such as Peltier effect devices, resistive heating elements, fans for cooling and/or distributing heat, etc. By adjusting the temperature of one or more regions under a user's foot, the user may be provide with the sensation of walking on different types of materials (e.g., cold tiles, hot sand, etc.). Portion 10' may also include positioners such as pneumatic actuators, electromagnetic actuators such as motors, linear actuators based on solenoids, etc. These positioners may be used to impart local and/or global position changes to device 10. For example, one or both ends of a platform such as device 10 of FIG. 9 may be moved upwards in direction 71 and/or downwards in direction 73. This allows device 10 to be tilted forward, backwards, or to the left or right (e.g., to create an incline to simulate uphill or downhill movement, left/right movement, etc.)

Device 10 (e.g., portion 10') may also include electrically adjustable components for adjusting moisture in the vicinity of foot 72 such as a water reservoir and pumps to dispense water or other liquid to foot 72 through openings 75 or other suitable moisture dispensing structure (e.g., fabric, foam, mesh, and/or other materials with liquid passageways).

Figure 10:
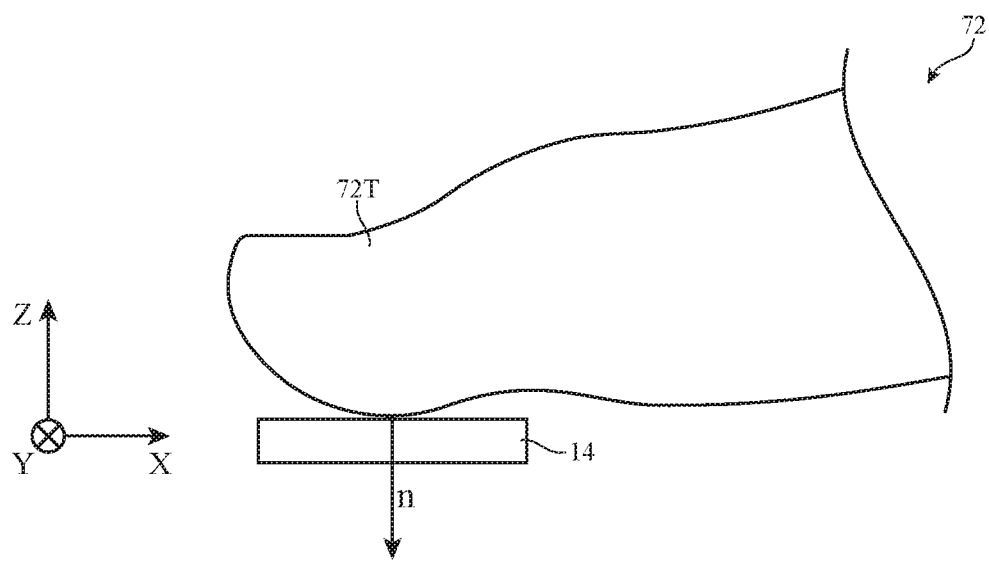
FIG. 10 is a side view of an illustrative haptic output component adjacent to a body part of a user such as a user's foot in accordance with an embodiment.

FIG. 10 shows how a portion of a user's foot 72 such as portion 72T may rest on a haptic output component 14. Portion 72T may rest on component 14 directly with skinto-component contact or portion 72T may indirectly rest against component 14 (e.g., in a configuration in which one or more layers of fabric and/or other materials in structure 70 that are transmissive to haptic output are interposed between the user's body and haptic output component 14).

Haptic output can be provided along one or more directions relative to surface normal n of the skin of user's foot 72. For example, haptic output can be provided in a direction (e.g., the −Z direction of FIG. 10) that is parallel to surface normal n. This type of haptic output may sometimes be referred to as normal haptic output or perpendicular haptic output. As another example, haptic output can be provided perpendicular to surface normal n (e.g., in the X-Y plane of FIG. 10). This type of haptic output generates shearing forces on the inner surface of support structure 70 and therefore foot 72 and may therefore sometimes be referred to as shear haptic output.

In general, haptic output components 14 may be oriented to generate movement perpendicular to the surface of structure 70 that is in contact with the user's foot and the corresponding surface of a user's foot (e.g., perpendicular to the skin of the user in a normal output configuration) and/or parallel to the surface of structure 70 that is in contact with the user's foot and the corresponding surface of the user's foot (e.g., parallel to the skin of the user in a shearing output configuration). Arrangements in which a fold of skin is pinched between two opposing haptic output devices 14 may also be used (e.g., to pinch and grip a fold of skin on an upper surface of a user's foot, etc.).

Figure 11:
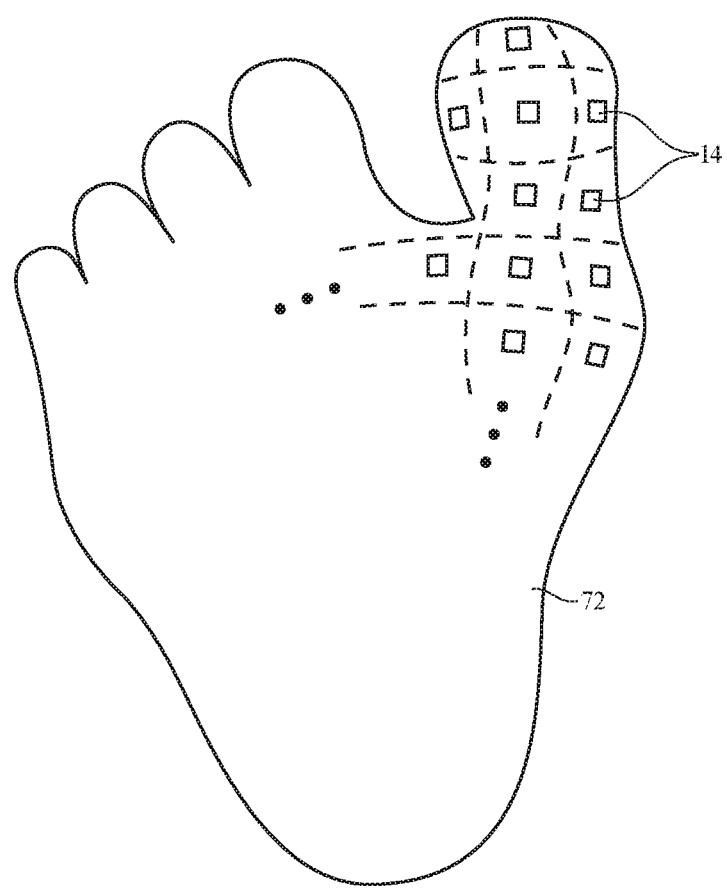
FIG. 11 is a bottom view of an illustrative foot and an associated array of haptic output components in accordance with an embodiment.

FIG. 11 is a diagram of a lower surface of a user's foot showing how components 14 may be arranged in an array that covers some or all of a user's foot (e.g., the bottom of the user's foot and/or side and/or top surfaces of a user's foot). Components 14 may be arranged in an array having rows and columns of constant pitch and/or may be arranged in an array that has component-to-component spacing values that allow the array to conform to surface height variations in the surface of the user's foot. Components 14 may be mounted on flexible printed circuits, flexible printed circuits with arrays of openings and/or serpentine signal trace paths to enhance flexibility, fabric (e.g., fabric with conductive strands of material that serve as signal lines for components 14), and/or other flexible support structures and/or flexible interconnect structures. In some configurations, rigid substrates such as rigid printed circuit boards may be used in forming signal paths between components 14.

Figure 12:
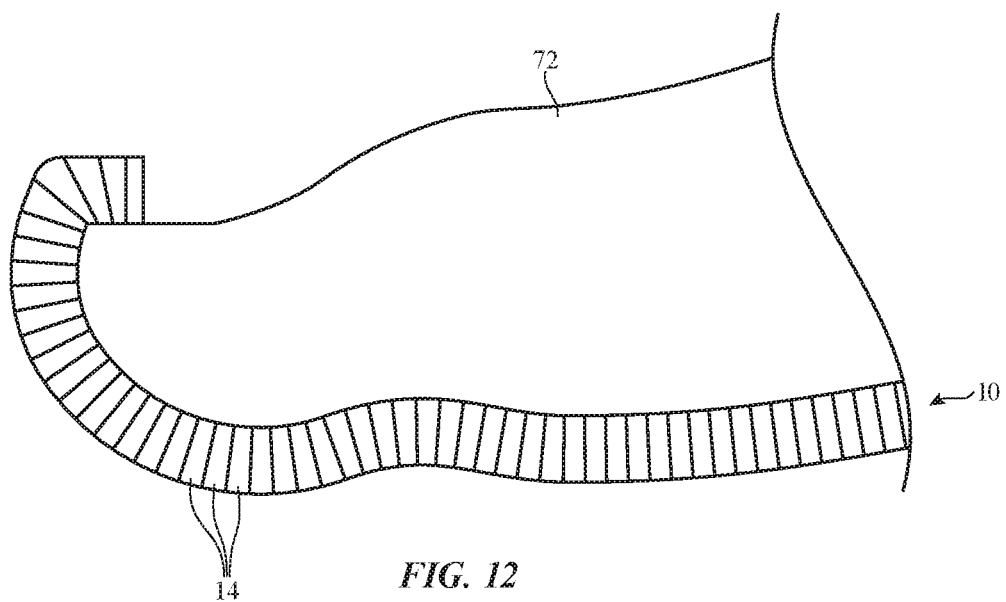
FIG. 12 is a cross-sectional side view of an illustrative haptic output device with stacked haptic output components for providing shear haptic output to a user's foot in accordance with an embodiment.

As shown in the cross-sectional side view of FIG. 12, haptic output components 14 (e.g., components formed from stacked output components 14 such as stack-shaped haptic output component 14 of FIG. 4 and/or other stacked output components) may be configured to exhibit shearing force across most or all of the lower surface of the user's foot (foot 72). Shear output may be used to create sensations of movement. In the example of FIG. 12, device 10 has a curved inner surface that wraps around the user's foot from bottom to top. Other configurations for device 10 may be used, if desired.

Figure 13:
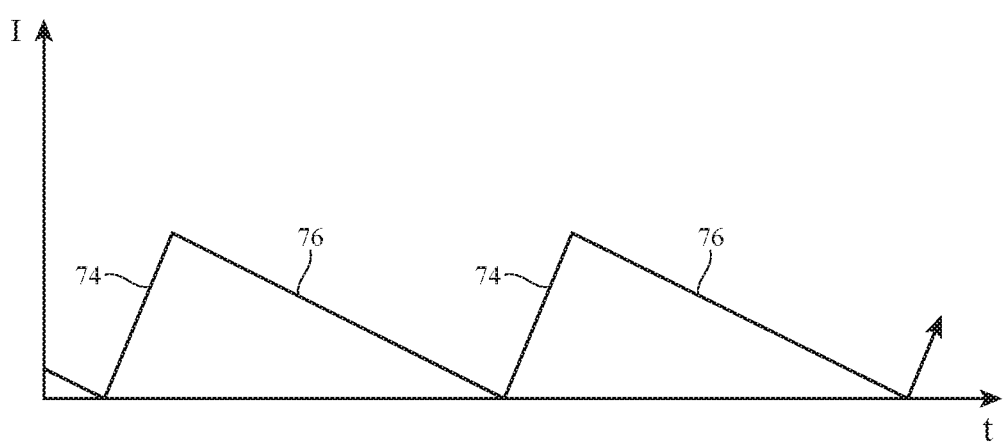
FIG. 13 is a graph showing how haptic output drive signals may have asymmetric shapes in accordance with an embodiment.

An illustrative drive signal of the type that may be applied to haptic output components 14 is shown in FIG. 13. In the graph of FIG. 13, drive signal intensity I, which is associated with corresponding haptic output device displacement, has been plotted as a function of time t. As shown in FIG. 13, asymmetric drive signals may be applied to a haptic output component. For example, signal I may have steeper portions such as portions 74 and less steep portions such as portion 76. In configurations in which portions 76 change slowly enough, the changes in displacement that are associated with portions 76 will not be sensed by a user. Because portions 76 are sufficiently slow in this type of configuration, the user's sense of touch will be insensitive to changes in haptic output device displacement that are associated with portions 76. Portions 74, however, change magnitude more abruptly than portions 76. As a result, the user's sense of touch will be sensitive to the changes in haptic output device displacement that are associated with portions 74. The overall result of using an asymmetric drive signal such as the illustrative asymmetrical sawtooth drive signal of FIG. 13 is that a user may sense a net displacement (net normal force and/or net shearing force) in a direction associated with portions 74 and will not sense restoring displacements associated with portions 76. A user may therefore be provided with the illusion of overall movement in a single direction even though foot 72 remains at a fixed location and the haptic output component moves back and forth by equal amounts. If desired, pairs of pulses may be used during haptic rendering and/or other haptic output may be provided.

Figure 14:
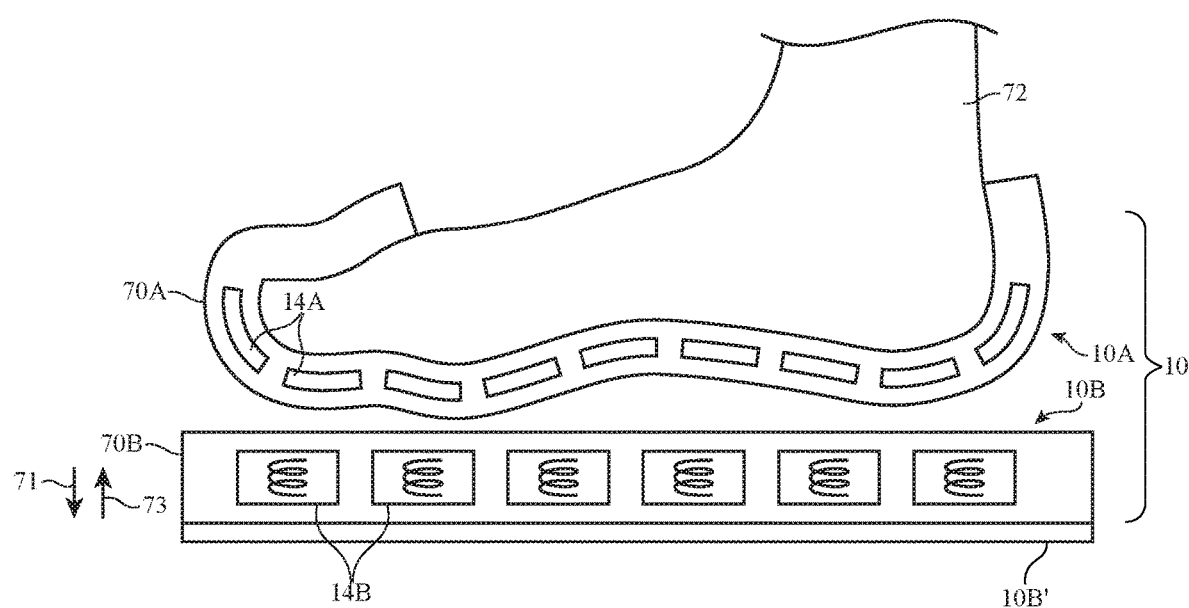
FIG. 14 is a cross-sectional side view of an illustrative electromagnetic haptic output system having magnets in a sock or shoe on a user's foot and corresponding electromagnets in a platform in accordance with an embodiment.

FIG. 14 is a cross-sectional side view of device 10 in an illustrative configuration in which device 10 has a first portion such as wearable portion 10A and a corresponding second portion such as platform portion 10B. Portions 10A and 10B may operate together to provide haptic output to user foot 72. As shown in FIG. 14, portion 10A may include support structure 70A with a first array of haptic output component portions such as haptic output components 14A. Haptic output components 14A may be mounted in support structure 70A, which may contain a foot-shaped cavity configured to receive a user's foot, so that portion 10A may be worn on the user's foot 72. Portion 10B may have a corresponding second array of haptic output component portions such as haptic output components 14B. Haptic output components 14B may be mounted in support structure 70B. Support structure 70B may have a planar foot-supporting shape. Structure 70B may, for example, form a foot platform (foot pad) with a planar exterior surface (upper surface) on which the user may stand during operation of device 10.

With one illustrative configuration, haptic components 14A are permanent magnets and haptic components 14B are electromagnets. In other configurations, components 14A may include electromagnets and/or components 14B may include permanent magnets. Components 14A and 14B are configured to repel and/or attract each other by application of appropriate drive signals to the coils in the electromagnets. There may be a one-to-one correspondence between components 14A and 14B or there may be different numbers of components 14A and 14B in device 10.

In configurations in which components 14A and 14B attract each other, a user may be provided with a sensation of resistance to lateral foot movement. In configurations in which components 14A and 14B repel each other, components 14A and 14B may be configured to provide a user with a sensation of low friction (e.g., components 14A and 14B may provide a user with a sensation of assisted lateral foot translation as components 14A and 14B repel each other and bias structure 70A laterally across the surface of structure 70B). Combinations of local attraction and local repelling between components 14A and 14B may also be used (e.g., to attract these components towards each other locally to create a sensation of weight, to implement a desired attraction/repelling pattern to render a texture for a user, etc.). If desired, electromagnets such as components 14B may repel components 14A under the arch of user's foot 72 (e.g., to render terrain such as a rock).

As described in connection with FIG. 9, device 10 of FIG. 14 may be provided with a portion such as portion 10B' that includes additional input-output devices such as heating and/or cooling elements, positioners, and/or other components. Heating and/or cooling elements may be globally and/or locally adjusted to provide a user with a desired temperature sensation such as walking on a cold surface, a hot surface, or a surface with a mixture of hot and cold regions. Positioners in portion 10B' may be used to impart global tilts and/or to otherwise manipulate the supporting portion of device 10. For example, positioners in device 10 may move one or both ends of a platform such as device 10 of FIG. 14 upwards in direction 71 and/or downwards in direction 73. For example, the front of device 10 may be moved downwards while the rear of device 10 is moved upwards to create a sensation that a user is facing downhill.

Although described in the context of haptic output devices that provide a user's feet with haptic output, haptic output devices such as haptic output device 10 may, if desired, be used to provide haptic output to other portions of a user's body (e.g., a user's head, hands, arms, legs, torso, etc.). Devices 10 may include components 14 that are supported directly on a user's foot (e.g., in a sock or shoe or other foot-wearable structure), components 14 that are supported within a foot platform on which a user stands, and/or components 14 that are formed in hybrid systems with both structures worn on the foot and platform structures. Haptic output provide by device 10 may include haptic output that is normal to the user's skin or other interaction surface and/or may include haptic output that is shear relative to the user's skin or other interaction surface.

Control circuitry 12 may supply global control signals to all of components 14 in synchronization (e.g., to provide global haptic output such as global vibrations) and/or may supply localized control signals to components 14 (e.g., to create corresponding localized haptic output such as localized vibrations). Configurations in which waves of displacement are created that travel across the surface of the foot or other body part may also be used.

During operation of device 10, slipping motion and other motions may be rendered using asymmetric drive signals such as the illustrative haptic output component drive signal of FIG. 13. In arrangements in which components 14 produce displacement that is normal to the surface of the user's foot (e.g., displacement in the Z direction of FIG. 10), device 10 may be used to generate a terrain height variations for the user. For example, device 10 may produce haptic output (e.g., normal haptic output) for a user's foot that provides the user with a sensation of standing or walking on a tile floor or sliding across a tile floor (e.g., a floor having a recognizable pattern of localized height variations). Sensations associated with other surfaces (e.g., standing, walking, and/or sliding on rocks, sand, etc.) may also be rendered, if desired.

Shear forces may be applied to create a sense of friction on the user's skin. Graded changes in displacement (e.g., from perpendicular haptic output) may be used to create the sensation of elevation and/or incline. Moisture and temperature effects may also be created by applying appropriate drive signals to an array of haptic output components 14 in device 10 (e.g., to create a sheer force, etc.) and/or by supplying drive signals to moisture generators, heating elements, etc. Haptic output may include slowly varying displacement (e.g., direct-current displacement that varies over seconds or minutes or that is constant) and/or may include more rapidly varying displacement (e.g., alternating current vibrations at frequencies of 50-2000 Hz, at least 20 Hz, at least 100 Hz, at least 500 Hz, less than 3000 Hz, less than 5000 Hz, etc.). Isolated pulses, pairs of pulses, other discrete numbers of pulses, and/or semicontinuous pulse trains may be used as drive signals. Arrangements in which other types of drive signals and displacement are provided by haptic output device 10 may also be used, if desired.

During a computer-game (e.g., when a user is wearing a head-mounted display coupled to device 24 and/or in a virtual reality or mixed reality environment provided with other equipment), control circuitry 12 in device 10 (and, if desired, control circuitry in a device coupled to device 10 such as device 24) may supply haptic output with device 10 that provides a user with a sensation of shear force on the user's feet (e.g., rendering friction, slipping sensations, etc.), that provides the user with a sensation of increased normal force on the foot of the user, and/or other haptic sensations. The haptic output that is provided may be provided based at least partly on feedback on user foot movement and/or other information that is gathered with motion sensors (e.g., inertial measurement units) and/or other sensors 18 in device(s) 10 and/or based on information received from device 24 (e.g., wirelessly received information such as haptic information associated with a game). Haptic output components 14 (e.g., a piezoelectric component or other component that bends or otherwise displaces in one direction more quickly than another) may be used to provide a user with sensations of continuous movement, continuous slipping, and/or other sensations during use of system 8.

The foregoing is merely illustrative and various modifications can be made to the described embodiments. The foregoing embodiments may be implemented individually or in any combination.

What is claimed is:

1. A haptic output device configured to be worn on a user's foot, the user's foot having a bottom portion and a top portion, the haptic output device comprising:
   a foot-wearable support structure; and
   an array of haptic output components supported by the foot-wearable support structure, wherein the array of haptic output components is arranged in rows and columns and extends from the bottom of the user's foot to the top of the user's foot, a first portion of the array of haptic output components is configured to apply feedback to the bottom portion of the user's foot and a second portion of the array of haptic output components is configured to apply feedback to the top portion of the user's foot, and the feedback is driven by asymmetrical sawtooth drive signals that move the haptic output components back and forth by equal amounts to provide the user with a feeling of movement in a single direction while the user's foot remains at a fixed location.

2. The haptic output device defined in claim 1 wherein the foot-wearable support structure is configured to form a sock.

3. The haptic output device defined in claim 1 wherein the foot-wearable support structure is configured to form a shoe.

4. The haptic output device defined in claim 1 wherein the haptic output components comprise haptic output components selected from the group consisting of: piezoelectric haptic output components, electroactive polymer haptic output components, and haptic output devices with coils and magnets.

5. The haptic output device defined in claim 1 wherein the haptic output components each include a stack of electrodes and interposed layers of adjustable material that expand and contract in response to signals applied to the layers with the electrodes.

6. The haptic output device defined in claim 1 wherein the inner surface has a curved portion configured to receive a portion of the user's foot.

7. The haptic output device defined in claim 1 further comprising an additional haptic output component configured to apply haptic output perpendicular to the inner surface.

8. The haptic output device defined in claim 1 wherein the foot-wearable support structure has an inner surface and wherein the haptic output components are configured to apply shear forces along the inner surface.

9. A haptic output device configured to be worn on a user's foot, comprising:
- a foot-wearable support structure, wherein the foot-wearable support structure has an inner surface;
- an array of haptic output components supported by the foot-wearable support structure, wherein the haptic output components are configured to apply shear forces along the inner surface; and
- control circuitry in the foot-wearable support structure that is configured to drive the haptic output components with asymmetric signals wherein the asymmetric signals comprise asymmetrical sawtooth drive signals, and the asymmetric sawtooth drive signals move the haptic output components back and forth by equal amounts to provide the user with a feeling of movement in a single direction while the user's foot remains in a fixed location.

10. The haptic output device defined in claim 9 further comprising:
- a sensor in the foot-wearable support structure, wherein the control circuitry is configured to adjust the haptic output components based on information from the sensor.

11. The haptic output device defined in claim 10 further comprising wireless communications circuitry coupled to the control circuitry, wherein the control circuitry is configured to communicate wirelessly with an electronic device using the wireless communications circuitry and is configured to adjust the haptic output components based on information received from the electronic device.

12. The haptic output device defined in claim 9 wherein the haptic output components each include a stack of electrodes and interposed layers of adjustable material that expand and contract in response to signals applied to the layers with the electrodes to apply the shear forces along the inner surface.

13. The haptic output device defined in claim 12 wherein the foot-wearable support structure is configured to form a shoe.

* * * * *